United States Patent [19]

Liu

[11] Patent Number: 4,481,331

[45] Date of Patent: Nov. 6, 1984

[54] POLYCARBONATE RESIN MIXTURE

[76] Inventor: Ping Y. Liu, 124 Tanager Ct., Naperville, Ill. 60565

[21] Appl. No.: 477,739

[22] Filed: Mar. 22, 1983

[51] Int. Cl.$^3$ .............................................. C08L 53/00
[52] U.S. Cl. ...................................... 525/92; 525/146; 525/901; 525/940
[58] Field of Search ................... 525/92, 146, 401, 940

[56] References Cited

U.S. PATENT DOCUMENTS

| | | | |
|---|---|---|---|
| 3,431,224 | 3/1969 | Goldblum | 260/13 |
| 4,088,711 | 5/1978 | Gergen | 260/873 |
| 4,102,854 | 7/1978 | Gergen et al. | 525/92 |
| 4,226,950 | 10/1980 | Holub et al. | 525/146 |

Primary Examiner—J. Ziegler

[57] ABSTRACT

Novel compositions with high resistance to environmental stress cracking and crazing comprise:

(a) an aromatic carbonate polymer; and
(b) a modifer combination therefor comprising:
  (i) a selectively hydrogenated linear, sequential, or radial teleblock copolymer resin of a vinyl aromatic compound $(A)_n$ and $(A')_n$ and an olefinic elastomer (B) of of the A—B—A'; A—(B—A—B)$_n$—A; A(BA)$_n$B; (A)$_4$B; B(A)$_4$; or B((AB)$_n$B)$_4$ type, wherein n is an integer from 1 to 10;
  (ii) an olefin-acrylate or methacrylate copolymer, alone, or in further combination with
  (iii) a polyolefin.

26 Claims, No Drawings

POLYCARBONATE RESIN MIXTURE

BACKGROUND OF THE INVENTION

This invention relates to thermoplastic resin compositions and more particularly is concerned with polycarbonate resin mixtures having improved impact strength, especially in thick sections, and extraordinary resistance to environmental stress crazing and cracking.

Aromatic carbonate polymers are well known, commercially available materials having a variety of applications in the plastics art. Such carbonate polymers may be prepared by reacting a dihydric phenol, such as 2,2-bis(4-hydroxyphenyl)propane, with a carbonate precursor, such as phosgene, in the presence of an acid binding agent. Generally speaking, aromatic polycarbonate resins offer a high resistance to the attack of mineral acids, may be readily molded, and are physiologically harmless as well as stain resistant. In addition, such polymers have a high tensile and impact strength (except in thick molded sections), and a dimensional stability surpassing that of other thermoplastic materials. However, in certain applications, the use of aromatic polycarbonate resins is limited because they exhibit severe environmental stress crazing and cracking. "Environmental stress crazing and cracking" refers to the type of failure which is hastened by the presence of organic solvents such as, for example, gasoline, particularly high octane no lead gasoline, acetone, heptane and carbon tetrachloride when such solvents are in contact with stressed parts fabricated from aromatic polycarbonate resins. The most significant effect is a loss in vital impact strength and also an increase in brittle-type failure. Contact with such solvents may occur, for example, when parts are used under the hood of automobiles, or near the gasoline filler ports thereof, or when solvents are used to clean or degrease stressed parts made from polycarbonate resins.

In Goldblum, U.S. Pat. No. 3,431,224, assigned to the same assignee as this application, it is proposed to add modifiers to polycarbonate, in certain proportions, the modifiers comprising at least one member of the class consisting of polyethylene, polypropylene, polyisobutylene, a copolymer of ethylene and an ethyl acrylate, a copolymer of ethylene and propylene, a cellulose ester, a polyamide, a polyvinyl acetal, an alkyl cellulose ether, and a polyurethane elastomer. While the results with such modifiers are generally excellent, in thin sections, e.g., ⅛ inch, it has been found, as will be shown later herein, that there is a tendency for failure to occur with these modifiers in thicker molded parts, e.g., of ¼ inch thickness, and such failure is of the undesirable brittle type, especially after exposure to high test gasoline. Another modifier proposed to be added to polycarbonate is reported in Research Disclosure No. 20810, Dow Chemical Company, August, 1981. Data are provided showing that polycarbonate modified with a linear low density polyolefin, namely, ethylene/octene-1 copolymer, provide good impact strength at increased part thickness. There is no suggestion therein that such a modifier will enhance resistance to environmental stress crazing and cracking. Still other modifiers have been proposed for impact strength improvement, and for slight improvement in optimum environmental stress crazing and cracking resistance—applicant's earlier filed commonly assigned U.S. patent applications, Ser. No. 238,643, filed Feb. 26, 1981; Ser. No. 343,949, filed Feb. 29, 1982; and Ser. No. 352,382, filed Feb. 25, 1982, being expressly mentioned in this connection. Ser. Nos. 238,643 and 352,382 describe polycarbonates modified with a combination of a butadiene-styrene coupled block copolymer, an acrylate core-shell multiphase interpolymer and, optionally, an olefin/acrylate copolymer. Such compositions process well and are toughened, but there is no disclosure of significant solvent resistance. Ser. No. 343,959 describes polycarbonate resins modified with a combination of the coupled block copolymers and a linear low density polyolefin resin. There is no mention that such modifier combinations will provide enhanced resistance to environmental stress crazing and cracking.

SUMMARY OF THE INVENTION

Unexpectedly, in view of the foregoing, it has now been discovered that polycarbonate resins may be rendered more resistant to environmental stress crazing and cracking by incorporating therewith, in certain proportions, a modifier combination comprising a selectively hydrogenated linear, sequential or radial teleblock copolymer of a vinyl aromatic compound $(A)_n$ and $(A')_n$ and an olefinic elastomer (B), of the A-B-A'; A-(B-A-B)$_n$-A; A(BA)$_n$B; (A)$_4$B; B(A)$_4$ or B((AB)$_n$B)$_4$ type wherein n is an integer of from 1 to 10; and an olefin copolymer with an acrylate or methacrylate comonomer. In a preferred feature, the modifier combination will comprise the said selectively hydrogenated linear, sequential or radial teleblock copolymer, the olefin copolymer with an acrylate or methacrylate comonomer and, in addition, a polyolefin, preferably a linear low density polyolefin.

It has now been found that when either of the above-mentioned modifier combinations is added to the polycarbonate resin, within a certain range, the resultant mixture possesses a resistance to environmental stress crazing and cracking greater than that possessed by the polycarbonate resin itself.

DESCRIPTION OF THE INVENTION

In accordance with the invention it has been found that the foregoing desirable properties are obtained with resin mixtures comprising:
(a) an aromatic polycarbonate resin; and
(b) a modifier combination therefor comprising:
  (i) a selectively hydrogenated linear, sequential or radial teleblock copolymer of a vinyl aromatic compound (A) and $(A')_n$ and an olefinic elastomer (B) of the A-B-A'; A-(B-A-B)$_n$-A; A(BA)$_n$B; (A)$_4$B; B(A)$_4$; or B((AB)$_n$B)$_4$ type, wherein n is an integer of from 1 to 10; and
  (ii) a copolymer of an olefin and at least one of a $C_1$-$C_6$ alkyl acrylate, a $C_1$-$C_6$ alkyl methacrylate, acrylic acid, methacrylic acid, or a mixture of any of the foregoing,
said modifier being present in said mixture in an amount at least sufficient to impart to said mixture a resistance to environmental stress crazing and cracking greater than that possessed by said polycarbonate resin.

In accordance with another aspect of the invention there are provided resin admixtures comprising:
(a) an aromatic polycarbonate resin; and
(b) a modifier combination therefor comprising
  (i) a selectively hydrogenated linear, sequential or radial teleblock copolymer of a vinyl aromatic compound $(A)_n$ and $(A')_n$ and an olefinic elastomer (B) of the A-B-A'; A-(B-A-B)$_n$-A; A(BA)$_n$B;

bly prepared from alkenyl aromatic hydrocarbons and particularly vinyl aromatic hydrocarbons wherein the aromatic moiety may be either monocyclic or polycyclic. Typical monomers include styrene, alpha methyl styrene, p-methyl styrene, vinyl xylene, ethyl vinyl xylene, vinyl naphthalene, and the like, or mixtures thereof. The end blocks (A) and (A'), may be the same or different. They are preferably selected from styrene, alpha-methyl styrene, vinyl toluene, vinyl xylene, vinyl naphthalene, especially styrene. The center block (B) may be derived from, for example, butadiene, isoprene, 1,3-pentadiene, 2,3-dimethylbutadiene, and the like, and it may have a linear, sequential or teleradial structure.

The selectively hydrogenated linear block copolymers are described by Haefele et al., U.S. Pat. No. 3,333,024, which is incorporated herein by reference.

The ratio of the copolymers and the average molecular weights can vary broadly although the molecular weight of center block should be greater than that of the combined terminal blocks. It is preferred to form terminal blocks A each having a weight average molecular weights of about 2,000 to 60,000 and center block B, e.g., a hydrogenated polybutadiene block with a weight average molecular weight of about 20,000 to 450,000. Still more preferably, the terminal blocks each have a weight average molecular weight of about 7,000 to 35,000 while the hydrogenated polybutadiene polymer blocks have a weight average molecular weight between about 30,000 and 150,000. The terminal blocks will preferably comprise about 20 to 45% by weight, or more, preferably about 25 to 40% by weight, of the total block polymer. The preferred copolymers will be those having a polybutadiene center block wherein 35 to 55% of the butadiene block segment is the structure resulting from 1,2 addition.

The hydrogenated copolymers will have the average unsaturation reduced to less than 20% of the original value. It is preferred to have the unsaturation of the center block B reduced to 10%, or less, preferably, 5% or less of its original value. After hydrogenation, center blocks B derived from isoprene will have the EB (ethylene-butylene structure).

The block copolymers are formed by techniques well known to those skilled in the art. Hydrogenation may be conducted utilizing a variety of hydrogenation catalysts such as nickel on kieselguhr, Raney nickel, copper chromate, molybdenum sulfide and finely divided platinum or other noble metals on a low surface area carrier.

Hydrogenation may be conducted at any desired temperature or pressure, from atmospheric to 300 psig, the usual range being between 100 and 1,000 psig at temperatures from 75° F. to 600° F. for times between 0.1 and 24 hours, preferably, from 0.2 to 8 hours.

Hydrogenated block copolymers such as Kraton G-1650 and Kraton G-1651 from Shell Chemical Company, Polymers Division, have been found usable according to the present invention. Also usable are the Solprenes of Phillips.

The radial teleblock copolymers of which the Solprenes are typical examples can be characterized as having at least three polymer branches with each branch of the radial block polymer comprising terminal non-elastomeric segments, e.g. (A) and ($A^1$) as defined hereinabove. The branches of the radial block polymer contain a terminal non-elastomeric segment attached to an elastomeric polymer segment, e.g., (B) as defined above. These are described in Marrs, U.S. Pat. No. 3,753,936 and in Zelinski, U.S. Pat. No. 3,281,383, both of which are incorporated herein by reference, and they are selectively hydrogenated by procedures known per se. In any event, the term, "selective hydrogenation" is used herein to contemplate polymers in which the elastomeric blocks (A) and ($A^1$) have been left unhydrogenated, i.e., aromatic.

Copolymer component (b)(ii) is made from an olefin, e.g., ethylene, propylene, or the like, copolymerized with one or more of a comonomer comprising a $C_1$–$C_6$ alkyl acrylate, e.g., methyl acrylate, ethyl acrylate, hexyl acrylate and the like; a $C_1$–$C_6$ alkyl methacrylate, e.g., methyl methacrylate, ethyl methacrylate, hexyl methacrylate, and the like; acrylic acid; or methacrylic acid. Especially preferred are the well known copolymers of ethylene with an alkyl ester of acrylic acid. These are disclosed in U.S. Pat. No. 2,953,551. Generally, the acrylate or methacrylate portion of the copolymer can range from about 10 to about 30 weight percent. The olefin portion of the copolymer can range from about 70 to about 90 weight percent. The preferred copolymer for use as component (b)(ii) is an ethylene-ethyl acrylate copolymer in which the weight ratio of the ethylene fraction to the ethyl acrylate fraction is about 4.5 to 1. Suitable olefin-acrylate copolymers, as defined above, can be prepared by methods well known to those skilled in the art or can be obtained commercially. For example, Union Carbide's Bakelite ®DPD-6169 ethylene-ethyl acrylate copolymer is suitable for use in the present invention.

Component (b)(iii), which may be an olefin homopolymer or copolymer, is selected from among the materials well known in the art as comprising this class. Preferred for use in this invention are polymers which have been derived from olefins containing from 2 to 10 carbon atoms. Special mention is made of polyethylene, polypropylene, polyisobutylene and ethylene-propylene copolymers and EPDM copolymers in their various forms, since these are the most readily available commercially.

Methods for the preparation of these polymers, both commercial and non-commercial, are abundantly described in the literature and known to those skilled in the art. The polyethylenes can be prepared by various procedures, using anionic, cationic or free-radical initiating catalysts, with conditions varied to produce a range of molecular weights and densities and various degrees of branching or non-branching for the polymer. In one procedure, which involves free radical initiation, ethylene gas is polymerized in the presence of a peroxide initiating catalyst at a pressure between 15,000 and 40,000 psi and a temperature between 100° and 200° C., to produce a relatively low density polymer, 0.90 to 0.94 $g/cm^3$.

The polyethylene can also be prepared by low pressure processes effective to attain a polymer of higher molecular weight and a higher density. In one such procedure, known as the Phillips process, ethylene is contacted in an insert solvent with a slurry of a catalyst, such as chromium oxide supported on silica-alumina, at pressures of 400 to 500 psig and temperatures of 130° to 170° C., followed by extraction of the polymer with hot solvent and purification, to produce a polyethylene product having a density between 0.96 to 0.97 $g/cm^3$.

Still other procedures are possible, such as emulsion polymerization in aqueous media in the presence of a peroxy compound, as well as suspension polymerization at low temperatures using a silver salt-peroxide redox system.

Any of the foregoing processes are utilizable to obtain polymers of ethylene suitable for use in the present compositions.

Also employable as component (b)(iii) is polypropylene, a common commercial form of which is crystalline isotactic polypropylene. Such polymers can be prepared by anionically initiated reactions using Ziegler type catalysts, e.g., titanium halide such as $TiCl_3$ in combination with an organometallic co-catalyst such as trialkyl aluminum halide. Polymerization generally proceeds rapidly at temperatures between 25° and 100° C. to yield a polymer in the form of a slurry of insoluble granular powder.

Copolymers of ethylene and propylene can be prepared using procedures similar to those for polyethylene and other polyolefins; for instance, by the polymerization reaction of a mixture of ethylene and propylene in the presence of a Ziegler type catalyst (e.g., transition metal compound and organometallic compound), or by free radical initiation under high pressures.

Polymers based on still higher olefins are not as readily available and, therefore, not as preferred. Examples of such higher polyolefins are polymers based on 3-methyl-1-butene $(H_2C=CHCH(CH_3)_2)$; 1-pentene $(H_2C=CHCH_2CH_3)$; 4-methyl-1-pentene $(H_2C=CHCH_2CH_2-(CH_3)_2)$ and isobutylene. They can be prepared by known procedures including those described in The Encyclopedia of Polymer Science and Technology, John Wiley & Sons, Inc., Volume 9, pages 440-460 (1965).

The preferred linear low density polyolefin component (b)(iii) may be prepared by state-of-the-art polymerization processes such as those described in U.S. Pat. No. 4,076,698 and Eur. Pat. Appl. No. 4,645, both of which are incorporated by reference. The polymer may have a density between 0.89 and 0.96 g./cc. and a controlled concentration of simple side chain branching as opposed to random branching which distinguishes it from polymers such as high pressure low density polyethylene and high density polyethylene. The preferred range of density is 0.915 to 0.945 g./cc. The linear low density polymers preferably are made from ethylene and an alpha olefin of $C_3$ to $C_8$ carbon content, e.g., butene-1 and octene-1, or mixtures of such alpha-olefins. The comonomer is used in a minor amount, e.g., 10 mol % or less of the total amount of monomers. A preferred range is about 1-3 mol %. The preferred copolymer is a copolymer made from ethylene and butene-1 such as Escorene ®LPX-15 of Exxon, Houston, Tex.

Within the broad composition ranges specified above, the following have been found to provide desirable properties for the ternary mixtures: polycarbonate component (a) comprises from about 50 to about 96 parts by weight; the selectively hydrogenated A-B-A' type block copolymer component (b)(i) comprises from about 2 to about 25 parts by weight; and olefin-acrylate or methacrylate component (b)(ii) comprises from about 2 to 25 parts by weight, per 100 parts by weight of components (a), (b)(i) and (b)(ii) combined. Preferred ranges are from about 70 to about 94 parts by weight (a) and from about 3 to about 15 parts by weight (b)(i) and from about 3 to about 15 parts by weight preferably as the acrylate (b)(ii). Desirable ranges for the quaternary mixtures are as follows: polycarbonate component (a) comprises from about 60 to 92 parts by weight; the selectively hydrogenated A-B-A'0 type block copolymer component (b)(i) comprises from about 5 to about 15 parts by weight; olefin-acrylate or methacrylate component (b)(ii) comprises from about 2 to about 15 parts by weight; and polyolefin component (b)(iii) comprises from about 1 to about 10 parts by weight, per 100 parts by weight of components (a), (b)(i), (b)(ii) and (b)(iii) combined.

The resistance to environmental stress crazing and cracking of the polycarbonate resin mixtures prepared in accordance with the invention was determined by subjecting stressed specimens to gasoline soaking and then measuring their impact strengths with special attention to the mode of failure, ductile failure being preferable. The specimens are ASTM D-256 impact test bars of two sizes: $2\frac{1}{2}''\times\frac{1}{2}''\times\frac{1}{8}''$ and $2\frac{1}{2}''\times\frac{1}{2}''\times\frac{1}{4}'''$. Values of the desired stress were applied to each test bar by mounting on an ASTM stress jig (1 percent strain). The mounted bars were soaked 2 hours at room temperature in AMOCO ® unleaded premium grade gasoline. They were then removed from the jig, evaporated and dried for 24 hours. Izod impact strengths were then determined according to ASTM D 256 procedures on notched specimens. In all cases, the properties are compared with those of identical unsoaked, molded mixtures. Those which retain a substantial amount of impact resistance after soaking obviously are the best at resisting environmental stress cracking.

DESCRIPTION OF THE PREFERRED EMBODIMENTS

In order that those skilled in the art may better understand how the present invention may be practiced, the following examples are given by way of illustration and not by way of limitation. All parts and percentages are by weight unless otherwise noted. The various polycarbonate resin mixtures were molded into the test specimens in a 3 oz. Van Dorn injection molding machine. The temperatures used were 270° C. on the cylinder and nozzle with a range of from 265° C. to 285° C.

EXAMPLE 1

An aromatic polycarbonate derived from 2,2-bis(4-hydroxyphenyl) propane and having an intrinsic viscosity (i.v.) in the range of from about 0.46 to about 0.49 dl/g. as determined in a methylene chloride solution at 25° C. (General Electric LEXAN ®140) was mixed with a selectively hydrogenated styrene-butadiene styrene block copolymer (Shell Chemical Kraton G 1650 and Kraton G 1651, respectively); an olefin-acrylate copolymer having a weight ratio of ethylene:ethyl acrylate of about 4.5:1 (Union Carbide DPD 6169); and a linear low density polyolefin which is a copolymer of ethylene and butene-1 (Exxon Company, ESCORENE LPX-15). The ingredients were then blended together by mechanically mixing them in a laboratory tumbler and the resulting mixture was fed to an extruder which was operated at about 255° C. The resulting extrudates were comminuted into pellets. The pellets were injection molded at about 265° C. to 285° C. into test specimen of about $2\frac{1}{2}''$ by $\frac{1}{2}''$ by $\frac{1}{4}''$ and $2\frac{1}{4}''\times\frac{1}{2}''\times\frac{1}{8}''$, the latter dimension being specimen thickness. Some of the specimens were mounted on an ASTM stress jig (1% strain) and soaked in AMOCO ® premium unleaded gasoline for 24 hours. Others, where indicated, were soaked for two hours. They were removed from the jig, the gasoline allowed to evaporate at room temperature for 24 hours, and then were tested. Where indicated Izod impact strengths of these specimens were measured according to the notched Izod test, ASTM D256 and are set forth in Table 1. The numerical superscripts indicate the percent of test specimens which were ductile in failure, no superscript indicating 100% ductility. Samples labeled control were the bisphenol A polycarbonate, containing no selectively hydrogenated A-B-A block copolymer and/or olefin copolymer, but otherwise modified as indicated. The formulations used and the results obtained are set forth in Table 1:

TABLE I
POLYCARBONATE MODIFED WITH SELECTIVELY HYDROGENATED A-B-A BLOCK COPOLYMER, OLEFIN-ACRYLATE COPOLYMER AND LINEAR LOW DENSITY POLYOLEFIN

| EXAMPLE | 1A* | 1B* | 1 |
|---|---|---|---|
| COMPOSITION (pbw) | | | |
| polycarbonate | 90 | 90 | 82 |
| hydrogenated styrene-ethylene butylene-styrene block copolymer 1. | — | 10 | — |
| hydrogenated styrene-ethylene butylene-styrene block copolymer 2. | — | — | 10 |
| ethylene-ethyl acrylate copolymer | 7.0 | — | 6.0 |
| linear low density polyethylene | 3.0 | — | 2.0 |
| PROPERTIES | | | |
| Notched Izod impact strength | | | |
| ⅛", ft. lbs./in. | 15.3** | 12.2 | 11.1 |
| ¼" ft. lbs./in | 10.6 | 10.5 | 9.9 |
| SOAKED IN GASOLINE | | | |
| Notched Izod impact strength | | | |
| ⅛", ft. lbs./in. | 1.1° | 0.9° | 11.1 |
| ¼", ft. lbs./in. | 1.1° | 0.9° | 6.3 |

*Control
**Unless otherwise specified, all were 100% ductile at failure
1. Kraton G 1650, Shell Chemical Company.
2. Kraton G 1651, Shell Chemical Company.

The results demonstrate that after soaking in gasoline, the composition in accordance with this invention exhibited unexpectedly high impact strengths in comparison with the controls, Example 1A and 1B.

EXAMPLES 2–17

The procedures of Example 1 was repeated, substituting formulations listed in Table 2, which follows. In two instances, glass reinforcement was also included and the results of testing appear in Table 2.

TABLE 2
COMPOSITION OF POLYCARBONATE, BLOCK COPOLYMER AND POLYOLEFIN

| COMPONENT | A* | B* | C* | D* | 2 | 3 | 4 | 5 | 6 | 7 |
|---|---|---|---|---|---|---|---|---|---|---|
| Polycarbonate (LEXAN 140) | 100 | 96 | 94 | 95.7 | 80 | 85 | 82 | 82 | 82 | 82 |
| Selectively hydrogenated A-B-A block copolymer (Kraton G 1651) | — | — | — | 4.3 | 15 | 10 | 10 | 6 | 10 | 10 |
| Ethylene/ethyl acrylate copolymer (Union Carbide DPD 6169) | — | 4 | 6 | — | 5 | 5 | 4 | 6 | 2 | 6 |
| Linear low density polyethylene (Exxon, LPX-15) | — | — | — | — | — | — | 4 | 6 | 6 | 2 |
| Ethylene/propylene copolymer (Shell, 7522) | — | — | — | — | — | — | — | — | — | — |
| Propylene (Exxon, PP 2032) | — | — | — | — | — | — | — | — | — | — |
| High density polyethylene (USI, LB 742) | — | — | — | — | — | — | — | — | — | — |
| Ethylene/propylene copolymer Hercules, SB 8623) | — | — | — | — | — | — | — | — | — | — |
| Glass Fibers, ⅛" chopped (OCF, 415BB) | — | — | — | — | — | — | — | — | — | — |
| PROPERTIES: | | | | | | | | | | |
| Notched Izod impact strengths | | | | | | | | | | |
| ⅛", ft. lbs./in. | 14.8 | 15.9 | 14.8 | 15.0 | 13.5 | 13.6 | 13.4 | 13.6 | 13.4 | 13.6 |
| ¼", ft. lbs./in. | 1.6° | 1.9 | 11.6 | 14.0 | 9.9 | 11.6 | 10.5 | 11.6 | 10.6 | 11.3 |
| SOAKED IN GASOLINE* | | | | | | | | | | |
| Notched impact strengths | | | | | | | | | | |
| ⅛", ft. lbs./in. | broke | 0.9° | 1.3° | broke | 13.5 | 12.6 | 11.3 | 3.4 | 10.1 | 13.7 |
| ¼", ft. lbs./in. | — | 0.6° | 1.0° | — | 9.3 | 7.4 | 10.1 | 3.1 | 9.6 | 10.8 |

| COMPONENT | 8 | 9 | 10 | 11 | 12 | 13 | 14 | 15 | 16 | 17 |
|---|---|---|---|---|---|---|---|---|---|---|
| Polycarbonate (LEXAN 140) | 80 | 80 | 80 | 76 | 82 | 76 | 76 | 82 | 77.9 | 73.8 |
| Selectively hydrogenated A-B-A block copolymer (Kraton G 1651) | 10 | 10 | 10 | 10 | 10 | 10 | 10 | 10 | 9.5 | 9.0 |
| Ethylene/ethyl acrylate copolymer (Union Carbide DPD 6169) | 4 | 4 | 4 | 8 | 6 | 8 | 8 | 6 | 5.7 | 5.4 |
| Linear low density polyethylene (Exxon, LPX-15) | 6 | — | — | 6 | — | — | — | — | 1.9 | 1.8 |
| Ethylene/propylene | — | — | — | — | 2 | — | — | — | — | — |

TABLE 2-continued
COMPOSITION OF POLYCARBONATE, BLOCK COPOLYMER AND POLYOLEFIN copolymer (Shell, 7522)

| | | | | | | | | | | |
|---|---|---|---|---|---|---|---|---|---|---|
| Propylene (Exxon, PP 2032) | — | 6 | — | — | — | — | 6 | 2 | — | — |
| High density polyethylene (USI, LB 742) | — | — | — | — | — | 6 | — | — | — | — |
| Ethylene/propylene copolymer Hercules, SB 8623 | — | — | 6 | — | — | — | — | — | — | — |
| Glass Fibers, ¼" chopped (OCF, 415BB) | — | — | — | — | — | — | — | — | 5 | 10 |
| PROPERTIES: | | | | | | | | | | |
| Notched Izod impact strengths | | | | | | | | | | |
| ¼", ft. lbs./in. | 12.8 | 13.4 | 12.8 | 12.5 | 13.0 | 12.1 | 12.8 | 13.3 | 12.1 | 8.9 |
| ⅛", ft. lbs./in. | 10.4 | 10.8 | 10.0 | 10.6 | 11.0 | 10.3 | 10.4 | 10.8 | 7.0 | 5.1 |
| SOAKED IN GASOLINE | | | | | | | | | | |
| Notched Izod impact strengths | | | | | | | | | | |
| ¼", ft. lbs./in. | 13.4 | 13.0 | 12.8 | 12.5 | 13.0 | 12.1 | 12.8 | 13.3 | 7.9 | 5.5 |
| ⅛", ft. lbs./in. | 10.4 | 7.6 | 9.4 | 10.6 | 10.9 | 10.3 | 11.1 | 9.4 | 6.5 | 5.2 |

*Control
**2 hours immersion at 1% strain/3400 psi.

The results demonstrate that after gasoline soaking the impact strength of the new compositions of Examples 2–17 were substantially better than polycarbonate modified with block copolymer alone or with the olefin copolymer alone.

The above-mentioned patents, applications, and publications are incorporated herein by reference. Obviously, many variations will suggest themselves to those skilled in this art in light of the detailed description herein. For example, instead of a bisphenol-A polycarbonate, one containing units derived from tetramethylbisphenol-A or from dixylenol sulfone can be used. Instead of a hydrogenated styrene-butadiene-styrene triblock copolymer, a hydrogenated styrene-isoprene-styrene triblock can be used. Instead of an ethylene-ethyl acrylate copolymer, there can be used copolymers of ethylene and methyl methacrylate, ethylene and acrylic acid and ethylene and methacrylic acid. Instead of a linear low density polyethylene comprising units of ethylene and butene-1, there can be substituted one comprising units of ethylene and octene-1. The compositions can be provided in flame retardant modifications. All such obvious variations are within the full intended scope of the appended claims.

What is claimed is:

1. A resin mixture comprising:
   (a) an aromatic polycarbonate resin; and
   (b) a modifier combination therefor comprising
      (i) a selectively hydrogenated linear, sequential, or radial teleblock copolymer resin of a vinyl aromatic compound $(A)_n$ and $(A')_n$ and an olefinic elastomer (B), of the A-B-A'; A-(B-A-B)$_n$-A; A(-BA)$_n$B; $(A)_4$B; B$(A)_4$; or B$((AB)_nB)_4$ type, wherein n is an integer of from 1 to 10;
      (ii) a copolymer of an olefin and at least one of a $C_1$-$C_6$ alkyl acrylate, a $C_1$-$C_6$ alkyl methacrylate acrylic acid, methacrylic acid, or mixtures of any of the foregoing,
   said modifier being present in said mixture in an amount at least sufficient to impart to said mixture a resistance to environmental stress crazing and cracking greater than that possessed by said polycarbonate resin wherein (a) comprises from about 50 to 96 parts by weight of (a) and (b) together and (b)(i) comprises from about 2 to 25 parts by weight and (b)(ii) is from about 2 to 25 parts by weight, per parts by weight of (a) and (b) together.

2. A resin mixture as defined in claim 1 wherein the amount of modifier combination (b) ranges from about 4.0 to about 50 parts by weight per 100 parts by weight of resin (a) and modifier combination (b) together.

3. A resin mixture as defined in claim 1 wherein the aromatic carbonate polymer comprises recurring structural units of the formula:

$$\left( O-A-O-\overset{\overset{O}{\parallel}}{C} \right)$$

wherein A is a divalent aromatic radical of a dihydric phenol.

4. A resin mixture as defined in claim 3 wherein in said formula, A is derived from a 4,4'-dihydroxy-di-(mononuclear aryl) alkane.

5. A resin mixture as defined in claim 1 wherein said aromatic polycarbonate (a) comprises poly(2,2-dihydroxydiphenylpropane) carbonate.

6. A resin mixture as defined in claim 1 wherein said selectively hydrogenated block copolymer resin (b)(i), (A) and (A') are selected from styrene, alpha-methylstyrene, p-methyl styrene, vinyl toluene, vinyl xylene and vinyl naphthalene and (B) is selected from butadiene, isoprene, 1,3-pentadiene and 2,3-dimethyl-butadiene.

7. A resin mixture as defined in claim 6 wherein in said selectively hydrogenated block copolymer resin (b)(i), (A) is a styrene block, (B) is a diolefin block, and (A') is a styrene block.

8. A resin mixture as defined in claim 7 wherein in component (b)(i) terminal blocks (A) and (A') each have weight average molecular weights of about 2,000 to 60,000 respectively, and center block (B) has a weight average molecular weight of from about 20,000 to 450,000.

9. A resin mixture as defined in claim 1, wherein said copolymer component (b)(ii) comprises a copolymer of ethylene and ethyl acrylate.

10. A resin mixture as defined in claim 1 wherein component (a) comprises from about 70 to 94 parts by weight; component (b)(i) comprises from about 3 to about 15 parts by weight; and component (b)(ii) comprises from about 3 to about 15 parts by weight, per 100 parts by weight of components (a), (b)(i) and (b)(ii) combined.

11. A resin mixture comprising:
   (a) an aromatic polycarbonate resin; and (b) a modifier combination therefor comprising:
(i) a selectively hydrogenated linear, sequential, or radial teleblock copolymer resin of a vinyl aromatic compound $(A)_n$ and $(A')_n$ and an olefinic elastomer (B) of the A-B-A'; A-(B-A-B)$_n$-A; A(-BA)$_n$B; (A)$_4$B; B(A)$_4$; or B((AB)$_n$B)$_4$ type, wherein n is an integer of from 1 to 10;
(ii) a copolymer of an olefin and at least one of a $C_1$-$C_6$ alkyl acrylate, $C_1$-$C_6$ alkyl methacrylate, acrylic acid, or methacrylic acid; and
(iii) a polyolefin resin,
said modifier being present in an amount sufficient to impart to said mixture a resistance to environmental stress crazing and cracking greater than that possessed by said polycarbonate resin wherein (a) comprises from about 50 to 96 parts by weight of (a) and (b) together and (b) is about 4 to 50 parts of (a) and (b) together.

12. A resin mixture as defined in claim 11 wherein the amount of modifier combination (b) ranges from about 4.0 to about 50 parts by weight per 100 parts by weight of resin (a) and modifier combination (b) together.

13. A resin mixture as defined in claim 11 wherein the aromatic carbonate polymer comprises recurring structural units of the formula:

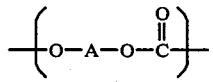

wherein A is a divalent aromatic radical of a dihydric phenol.

14. A resin mixture as defined in claim 13 wherein in said formula, A is derived from a 4,4-dihydroxy-di(-mononuclear aryl) alkane.

15. A resin mixture as defined in claim 11, wherein said aromatic polycarbonate (a) comprises poly-bis(4-hydroxyphenyl propane)carbonate.

16. A resin mixture as defined in claim 11 wherein in said selectively hydrogenated block copolymer resin (b)(i), (A) and (A') are selected from styrene, alpha-methylstyrene, p-methyl styrene, vinyl toluene, vinyl xylene, and vinyl naphthalene and (B) is selected from butadiene, isoprene, 1,3-pentadiene and 2,3-dimethylbutadiene.

17. A resin mixture as defined in claim 16 wherein in said selectively hydrogenated block copolymer resin (b)(i), (A) is a styrene block, (B) is a diolefin block, and (A') is a styrene block.

18. A resin mixture as defined in claim 17, wherein in component (b)(i) terminal blocks (A) and (A') each have weight average molecular weight of about 2,000 to 60,000 respectively, and center block (b) has a weight average molecular weight of from about 20,000 to 450,000.

19. A resin mixture as defined in claim 11, wherein said copolymer component (b)(ii) comprises a copolymer of ethylene and ethyl acrylate.

20. A resin mixture as defined in claim 11, wherein said polyolefin resin (b)(iii) is selected from a polyethylene resin, a polypropylene resin or an ethylene-propylene copolymer resin.

21. A resin mixture as defined in claim 11, wherein said polyolefin resin (b)(iii) is a linear low density polyolefin resin.

22. A resin mixture as defined in claim 20 wherein said linear low density polyolefin resin is a linear low density polyethylene resin.

23. A resin mixture as defined in claim 22 wherein said linear low density polyethylene resin is a copolymer of ethylene and butene-1.

24. A resin mixture as defined in claim 11 wherein component (a) comprises from about 60 to about 92 parts by weight; component (b)(i) comprises from about 5 to about 15 parts by weight; component (b)(ii) comprises from about 2 to about 15 parts by weight; and component (b)(iii) comprises from about 1 to about 10 parts by weight, per 100 parts by weight of components (a), (b)(i), (b)(ii) and (b)(iii) combined.

25. An article molded from the composition of claim 1.

26. An article molded from the composition of claim 11.

* * * * *